(12) United States Patent
Li et al.

(10) Patent No.: US 8,326,877 B2
(45) Date of Patent: Dec. 4, 2012

(54) REGION-BASED SECURITY

(75) Inventors: Ziquan Li, Redmond, WA (US);
Tanmoy Dutta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 83 days.

(21) Appl. No.: 11/122,299

(22) Filed: May 4, 2005

(65) Prior Publication Data

US 2006/0253443 A1    Nov. 9, 2006

(51) Int. Cl.
G06F 7/00    (2006.01)
G06F 17/30    (2006.01)

(52) U.S. Cl. ............................................ 707/786; 726/2

(58) Field of Classification Search ............... 707/9, 10, 707/101, 102, 104.3; 705/1, 7, 8, 10, 201, 705/230; 713/153, 155, 166, 167, 168, 170, 713/189, 193; 714/10, 38, 500, 508, 530; 715/500, 512, 732
See application file for complete search history.

(56) References Cited

U.S. PATENT DOCUMENTS

| | | | |
|---|---|---|---|
| 5,261,102 A * | 11/1993 | Hoffman | 726/19 |
| 5,414,834 A * | 5/1995 | Alexander et al. | 707/100 |
| 5,504,814 A * | 4/1996 | Miyahara | 726/4 |
| 5,694,590 A * | 12/1997 | Thuraisingham et al. | 707/9 |
| 6,105,066 A | 8/2000 | Hayes | |
| 6,125,447 A * | 9/2000 | Gong | 726/17 |
| 6,134,558 A * | 10/2000 | Hong et al. | 707/103 R |
| 6,202,066 B1 | 3/2001 | Barkley | |
| 6,381,605 B1 | 4/2002 | Kothuri et al. | |
| 6,446,206 B1 | 9/2002 | Feldbaum | |
| 6,795,450 B1 | 9/2004 | Mills | |
| 7,051,039 B1 * | 5/2006 | Murthy et al. | 1/1 |
| 7,127,461 B1 * | 10/2006 | Zhu et al. | 707/9 |
| 7,171,477 B2 * | 1/2007 | Hori et al. | 709/227 |
| 7,200,595 B2 * | 4/2007 | Dutta et al. | 707/9 |
| 7,490,347 B1 * | 2/2009 | Schneider et al. | 726/2 |
| 2002/0107889 A1 * | 8/2002 | Stone et al. | 707/513 |
| 2004/0078569 A1 * | 4/2004 | Hotti | 713/165 |
| 2004/0139075 A1 * | 7/2004 | Brodersen et al. | 707/6 |
| 2005/0050053 A1 * | 3/2005 | Thompson | 707/100 |
| 2005/0091518 A1 * | 4/2005 | Agarwal et al. | 713/193 |

(Continued)

FOREIGN PATENT DOCUMENTS

TW    200515213    5/2005

(Continued)

OTHER PUBLICATIONS

"European Union and United States Patents and Patent Applications for Microsoft Work Group Server Protocol Program Protocols", Dec. 18, 2009, Microsoft, pp. 1-22.*

(Continued)

*Primary Examiner* — Fred I Ehichioya
*Assistant Examiner* — Augustine K Obisesan
(74) *Attorney, Agent, or Firm* — Workman Nydegger

(57) ABSTRACT

The subject invention relates to systems and methods that provide region-based security to database objects having hierarchical relationships. In one aspect, a system is provided that facilitates database security and management. The system includes a database component that stores a plurality of objects having a hierarchical relationship between the objects. A region component defines security zones for a subset of the objects and maps security data to the subset, wherein the security zones are independent, decoupled, or disassociated from the hierarchical relationships between the objects.

19 Claims, 9 Drawing Sheets

U.S. PATENT DOCUMENTS

2005/0177570 A1*  8/2005  Dutta et al. .................. 707/9
2006/0005036 A1*  1/2006  Hu et al. .................... 713/182

FOREIGN PATENT DOCUMENTS

WO         2004023375      3/2004

OTHER PUBLICATIONS

"United States Patent(s) and Patent Application(s) for Microsoft Communications Protocol Program Protocols", Dec. 18, 2009, Microsoft, pp. 1-21.*

"United States Patents and Patent Applications for Windows 7 (including .NET Framework) Protocols", Dec. 28, 2009, Microsoft, pp. 1-17.*

Prasad et al., "Using Explicit Information to Map Between Two Ontologies", 2002, AAMAS 2002 Workshop, pp. 1-5.*

Microsoft, "Mapping policies between trust hierarchies", Jan. 21, 2005, Microsoft TechNet, pp. 1.3.*

Prasad et al., "A Tool for Mapping Concepts Between Two Ontologies", 2002, AAI 2002 Workshop, p. 1.*

A Role Based Access Control for Intranet Security, Tari et al, IEEE Internet Computing 1997.*

Ray, Indrakshi et al., "A Cryptographic Solution to Implement Access Control in a Hierarchy and More", *SACMAT'02*, Jun. 3-4, 2002, Monterey, California, USA, copyright 2002, 9 pages.

* cited by examiner

REGION-BASED SECURITY

TECHNICAL FIELD

The subject invention relates generally to computer systems, and more particularly, relates to systems and methods that provide security to a subset of objects based on a region descriptor for the subset in order to mitigate data propagation and storage requirements of classical object inheritance hierarchies.

BACKGROUND OF THE INVENTION

Modern commercial database design includes a host of complex data considerations involving how to store, manage, and manipulate large amounts of data. Such data often includes intricate relationships to other data such as in an object tree providing inheritance properties between various objects. These types of relationships often complicate the efficient design of databases and components to manage such data. For example, one aspect to the database design process lies in understanding the way a relational database management system stores data. To efficiently and accurately provide users with information, a database program needs to access facts (data) about different subjects stored in separate tables. For example, one table may only store facts about employees, and another table may only store facts regarding sales, and then other tables for some other corporate matter. When using data, these facts are then automatically combined and presented in many different ways. For example, users may print reports that combine facts about employees and facts about sales.

Generally, to design a database, information is broken down in some order such as separate subjects in a library and then a database program determines how the subjects are related. These programs often include a relational database query using a common database language such as Structured Query Language (SQL). Before such languages can be applied to data, several decisions are usually made as to which types of data are important and how such data should be organized. For instance, these decisions may include determining the scope of a database to decide which data to store therein. Then determining the tables needed to divide information into separate subjects, such as "Employees" or "Orders." Each subject will then be a table in the database. Other aspects include determining respective fields that are needed in order to decide what information to store in each table. Each category of information in a table is called a field and is displayed as a column in the table. For example, one field in an Employees table could be Last Name; another could be Hire Date. Another consideration is to determine relationships such as deciding how data in one table is related to the data in other tables. Designers often add fields to tables or create new tables to clarify the relationships, as necessary.

There are several common pitfalls that may be encountered when designing a database. These problems can cause data to be harder to use and maintain. These may include having one table with a large number of fields that don't all relate to the same subject. For example, one table might contain fields pertaining to customers as well as fields that contain sales information. Also, it is often more efficient if each table contains data regarding only one subject. In other cases, overhead is created when fields are intentionally left blank in many records because they are not applicable to those records. This usually implies that the fields belong in another table. Redundancy is another problem when a large number of tables, many of which having the same fields. For example, when separating tables for January sales and February sales, or for local customers and remote customers, in which there is a redundant store of the same type of information. Thus, one technique is consolidating all the information pertaining to a single subject in one table.

In addition to the complexities of how to setup and design the tables and fields of the database, other considerations must be taken. These include how should data security be provided for the respective tables and fields (e.g., security such as who or what can access a file). This includes how to provide security to complex structures stored in databases such as hierarchical objects. Classically, security considerations have been propagated in an inheritance hierarchy for such objects, wherein each item in the hierarchy would need to be updated if one of the items were changed. However, there is a common problem faced by any implementation that utilizes relational database's table rows to store hierarchical objects, which is how to set security information or data on each object and populate the security data to its child objects based on the inheritance model.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that provide region-based security to a plurality of database objects having hierarchical relationships between the objects. A region component is provided that maps security information to a subset of objects existing in a hierarchy in order to create one or more security zones that are independent of the hierarchy. This allows objects existing in a region or zone to share security attributes which mitigates database processing requirements (e.g., fewer nodes in which to update security data). In general, classical database architectures often utilize a relational database's table rows to store hierarchical objects, which is also causes a related security descriptor to be set on each object and also to populate the security descriptor to respective child objects based on the inheritance model. This causes ever increasing amounts of processing time for each object update and is mitigated by introducing region-based considerations.

A region can be a collection of objects (does not have to be in a contiguous tree) that share the same or similar security descriptor. When a security descriptor on an object is updated, the region to which the object belongs may split or collapse. For instance, a region can split if a different security descriptor on any child object is resulted from the change; whereas a region may collapse into another region if the change results into the same security descriptor as that of the other region. Instead of each object directly owning its own security descriptor, a region owns the security descriptor; thus dramatically reducing the number of object updates when a security descriptor on an object is changed that may affect the security descriptors on other objects.

In general, a region is classically defined as a sub tree of objects in a hierarchical object model. In the case of the subject invention, a region is defined as a set of objects sharing the same security descriptor, whereby those objects sharing the same security descriptor do not have to be under the same sub tree. This indirection allows for efficient processes to manipulate the objects' security descriptors. Thus, region-based security essentially transforms an object domain to a security descriptor domain and performs security descriptor operations on the security descriptor domain directly and independently from the hierarchy which mitigates overall database processing.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that provide region-based security to database objects having hierarchical relationships. Rather than updating a separate security descriptor for each object, the subject invention introduces the concept of a region, whereby security for a given object is derived from its association to the region as opposed to the hierarchy. This is in contrast to classical architectures that require individual object descriptions and have security imposed by the inheritance hierarchy. In this manner, database processing and storage can be conserved since many objects may share similar security attributes which can be defined on a more global scale for the respective region. In one aspect, a system is provided that facilitates database security and management. The system includes a database component that stores a plurality of objects having a hierarchical relationship between the objects. A region component defines security zones for a subset of the objects and maps security data to the subset, wherein the security zones are independent, decoupled, or disassociated from the hierarchical relationships between the objects.

As used in this application, the terms "component," "system," "object," "zone," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
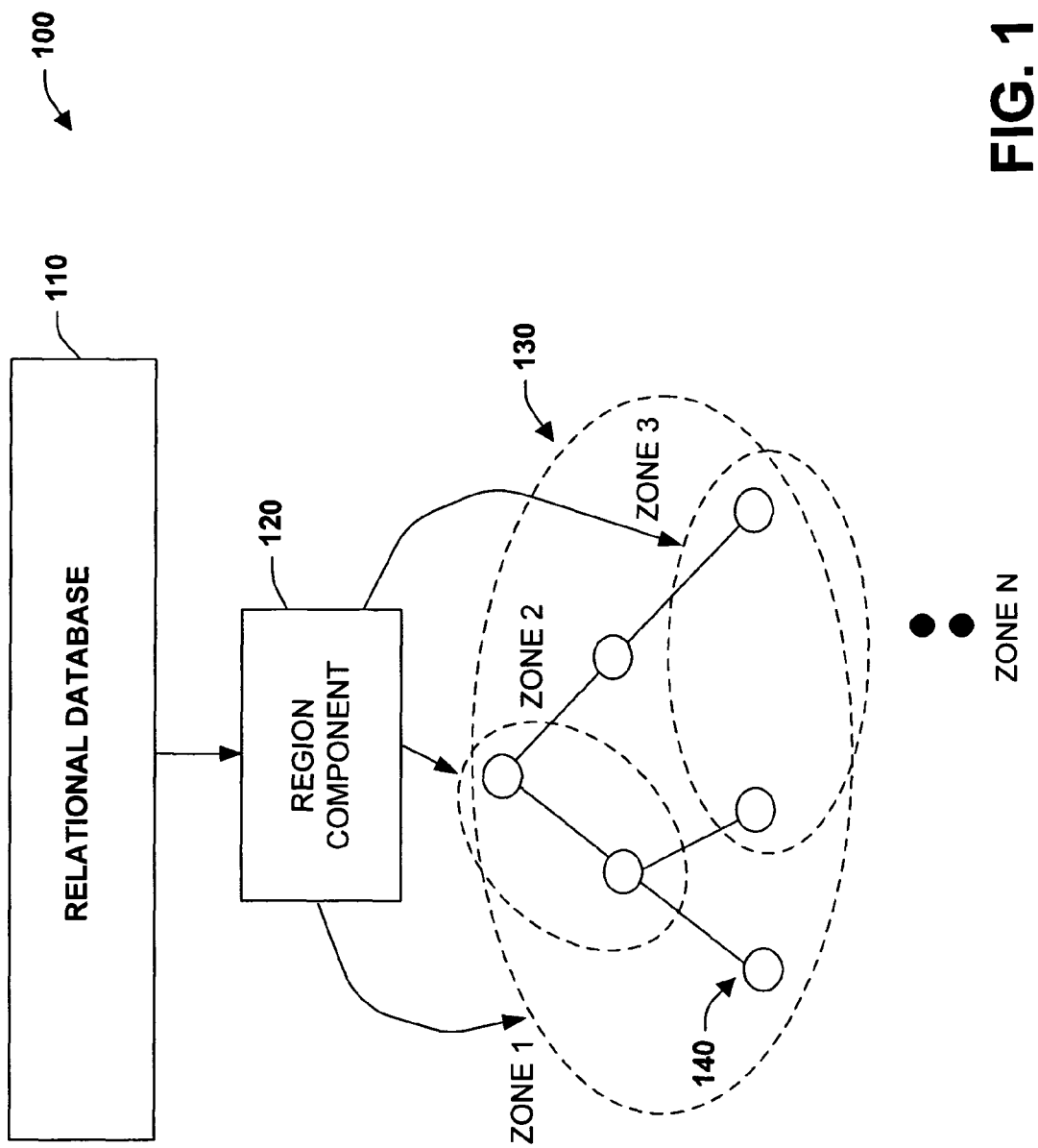
FIG. 1 is a schematic block diagram illustrating an object security system in accordance with an aspect of the subject invention.

Referring initially to FIG. 1, an object security system 100 is illustrated in accordance with an aspect of the subject invention. The system 100 includes a relational database 110 (e.g., SQL or other type database) that is associated with a region component 120 (or components) that defines one or more object security zones 130. In general, individual nodes of an object hierarchy (e.g., see one object of hierarchy at reference numeral 140) are not individually updated when object security changes are made. Rather, security policies are assigned by the region component 120 per the respective security zones at 130. By mapping objects to a security zone 130 rather than updating each object individually, the number of read/write operations at the database 110 can be mitigated. Thus, the region component 120 transforms security policy mapping from an inheritance hierarchy—where each object is updated, to a security domain of objects where zones of objects share a similar security policy. In this manner a smaller subset of security updates can be propagated when an object's security policy changes by merely updating the reduced subset of security zones 130 as opposed to updating each individual object in a classical inheritance hierarchy. It is noted that inheritance concepts can be employed to propagate policy in the system 100 however, inheritance is between security zones 130 rather than conventional inheritance between objects in a tree. Thus, inheritance occurs between components that are modeled in a security domain rather than an object domain. This implies that security mappings for a respective object are between the object and its associated zone 130 rather than explicitly set out per individual object 140. Therefore, the region component 120 provides security to a region of identified objects and essentially decouples, disassociates, or is independent of conventional object hierarchies that propagate security changes to all objects in the hierarchy.

In general, items in the database 110 can be assigned an (Identifier) ID for a security descriptor. The database includes a [Table!Item] table having a column called SDID (Security Descriptor ID). This SDID is a unique ID of a security descriptor which is stored and maintained in a hidden SQL system table, for example. A system table can be exposed through a public view (e.g., Sys.Security_Descriptor). The following table is a simplified illustration on how a security descriptor can be plugged into or associated with a basic object model:

| [Table!Item]: Associates an item with a security descriptor ID. | | |
|---|---|---|
| _ItemID | ... | _SDId ... |

| [Sys.Security_Descriptor]: Maps the ID to the content of the security descriptor. | | | |
|---|---|---|---|
| Sd_id | Type | SecurityDescriptor | ... |

To efficiently assign a security descriptor ID (SD ID) to an object item, an SD region technology is based in part on the observation that most object items tend to share the same security descriptor. An SD region is a set of items (which do not have to be contiguous as in conventional systems) that share the same or similar SD ID. Typically, all items in the [Table!Item] shown above can be grouped into different SD regions. The relationship of SD regions can be established in such a way that the SD of one SD region can inherit from the SD of another SD region in the security domain described above. In essence, a SD region tree is established that is comparable to the corresponding object item tree, but with fewer nodes as will be shown with respect to FIGS. 2 and 3 below. The SD region tree thus can be used to update the item's SD efficiently. Typically when an security item tree is created, three SD regions are created to assign SDs to substantially all the items in the tree. Thus, one SD region is for the root item (where an explicit SD is defined), another SD region is for the respective container items and the last SD for non-container items.

Figure 2:
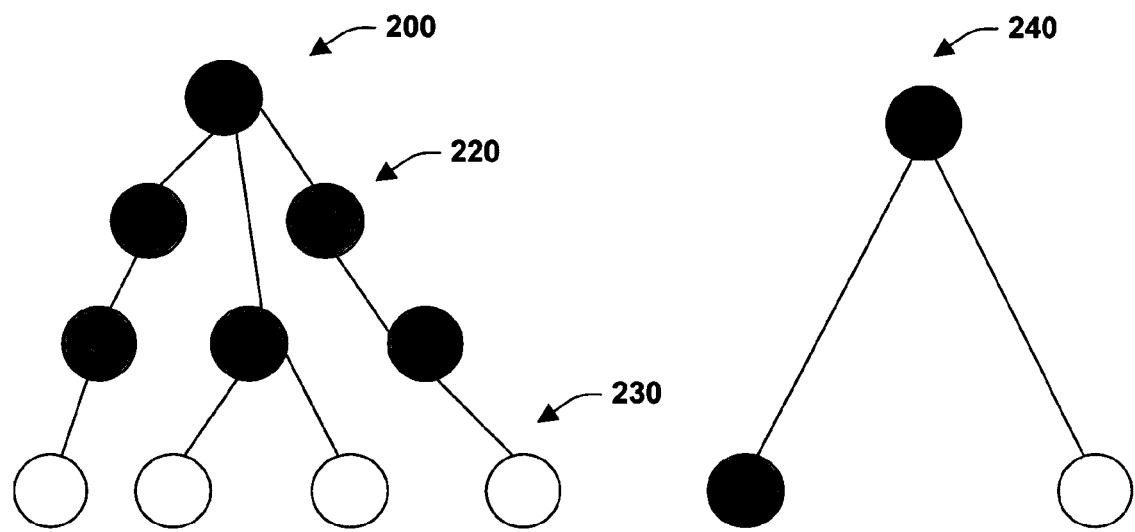
FIG. 2 is a diagram illustrating an example security domain transform in accordance with an aspect of the subject invention.
Figure 3:
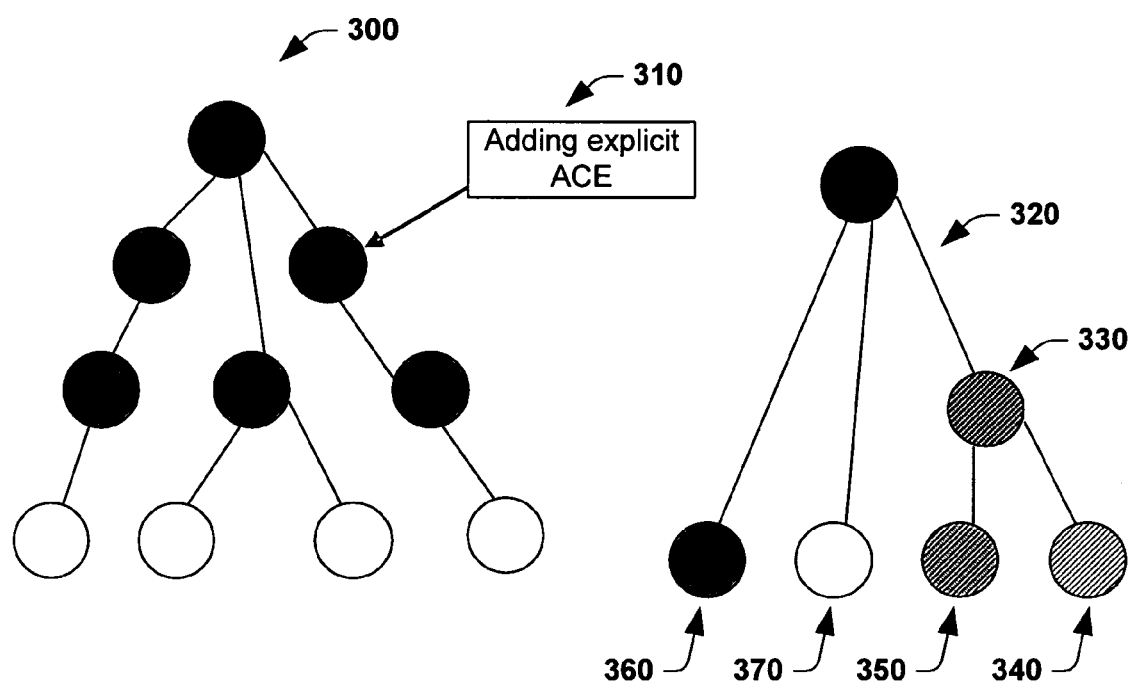
FIG. 3 illustrates an alternative security domain transform in accordance with an aspect of the subject invention.

Referring now to FIGS. 2 and 3, example security domain transforms 200 and 300 are illustrated in accordance with an aspect of the subject invention. At 200 of FIG. 2, the nodes of an object tree are illustrated, where a black node at 210 is a root item; grey nodes at 220 are container items, and white nodes at 230 are non-container items. When an item's security descriptor (SD) is updated (e.g., by changing the SD's owner, group, Access Control List and so forth), the SD region where the item belongs can be split into three subgroups or subsets as illustrated at 240. Security changes are generally effected through data referred to as an Access Control Entry (ACE) which can be of an explicit or an implicit form. When explicit ACEs are added to an item's SD, new SD regions can be created around this item. In this case, three SD regions are created, one for the item (where the explicit ACEs are added) itself, one for its container children and one for its non-container children. Referring to FIG. 3, a more complex situation is illustrated when a non-propagated explicit ACE is added to an SD on an item at 310, in which case five new regions are created around the item as illustrated at 320. In this case, one region is created for the item itself (where the explicit ACE is added) 330, one region for its direct container children at, one region for its direct non-container children at 350, one region for its non-direct container children at 360 and one region for its non-direct non-container children at 370.

To summarize FIGS. 2 and 3, new regions can be created when an item's SD is updated explicitly (not through inheritance). Generally, 3 or 5 new regions (other amounts possible) are created depending upon the updates being made to the SD. Five SD regions are created if a non-propagated ACE is added and three SD regions are generally created in other cases. As an example, assume the item whose SD contains non-inherited properties (non-inherited ACEs in most cases) as the Root Item. As noted above, a container-type Root Item can own 3 or 5 SD regions depending upon the types of explicit ACEs in the SD. A non-container can have its own SD region if its SD has explicit properties. If all of the explicit properties of a Root Item's SD are removed, then the SD regions owned by this Root Item may be collapsed into its parent item's SD which then mitigates individual object security updates. Each SD region can be represented as a row in a Security_Hierachy table such as the following example:

| [Table!Security_Hierachy]: Stores the SD inheritance relationship and establishes items to share the same security descriptor. | | | | |
|---|---|---|---|---|
| _SDIdParent | _SDId | _RootItemID | _IsContainer | _Scope |

The columns of the above table can include an _SDId which is the ID of the SD region, an _SDIdParent field which is the ID of the SD where the inherited security properties are coming from, a _RootItemID field which is the ID of the item where the explicit SD is defined, an _IsContainer field which is 1 if the SD applies to container, or 0 to a non-container, and a _Scope field that is encoded as follows: 0: the SD applies to the Root Item. 1: the SD only applies to the Root Item's children. 2: the SD applies to the Root Item's direct children. 3: the SD applies to the Root Item's non-direct children.

It is noted that when a database is bootstrapped, three default security descriptors can be created if desired; one descriptor for the top Root Item, one descriptor for all container children and one descriptor for all non-container children. Consequently, three SD regions on the top Root Item can be created also. Typically, all the items subsequently created in the volume can have one of the SDs as its default SD. When explicit ACEs are added to the item, new SD regions can be created as discussed above.

Figure 4:
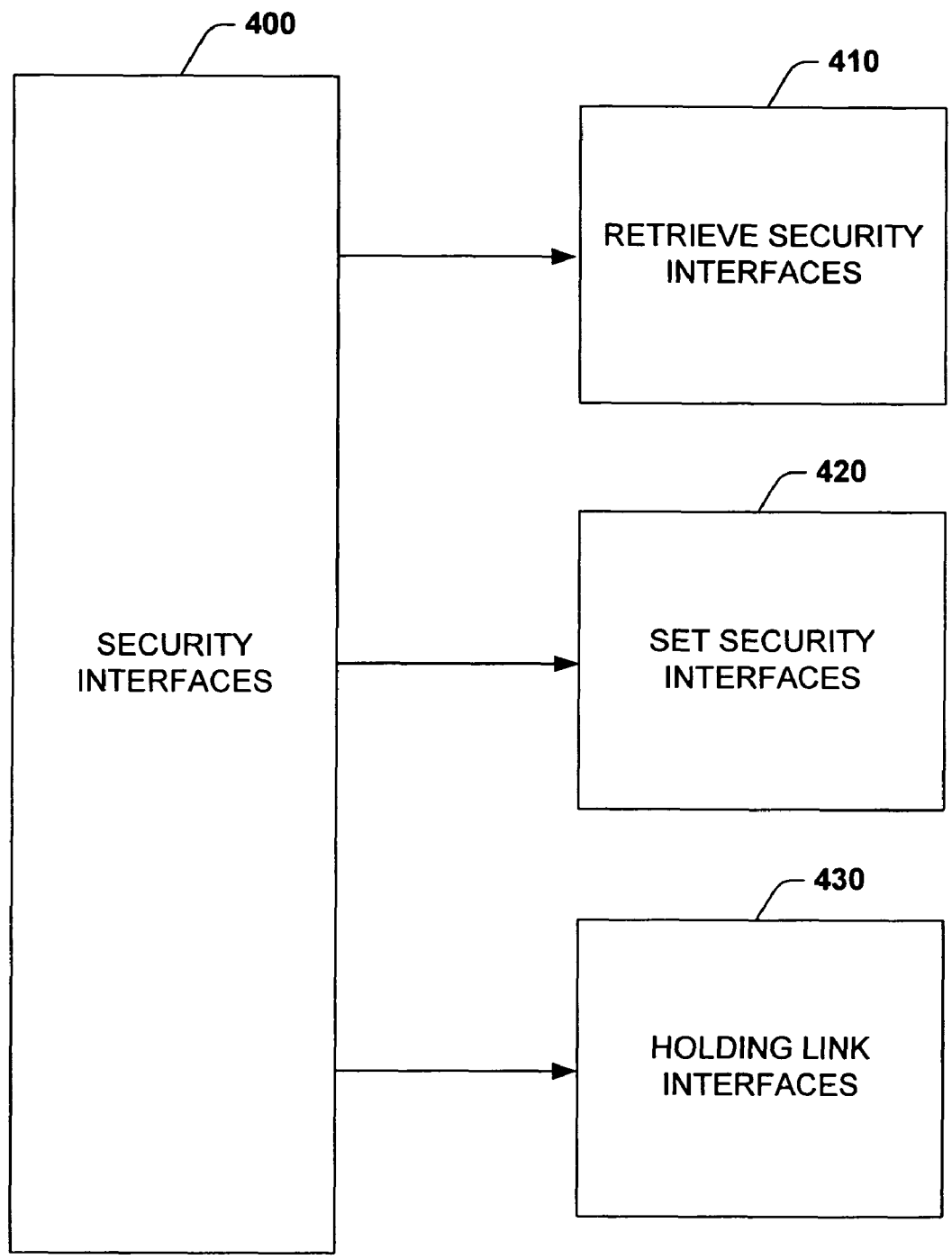
FIG. 4 illustrates example security interfaces in accordance with an aspect of the subject invention.

FIG. 4 illustrates example security interfaces 400 in accordance with an aspect of the subject invention. Various security interfaces 400 can be provided for interacting with the region-based considerations described above. The following will describe but a few interface examples that can be applied. These can include interfaces for retrieving security data at 410, interfaces for setting security information at 420, and interfaces for holding links as will be described in more detail below. The following code fragment is an example of a public declaration for some of these interfaces 400.

```
Public sealed class ItemSecurity
{
    public ItemSecurity( Guid itemId )
    public string GetSDDLSecurity( )
    public GenericSecurityDescriptor GetSecurity( )
    public void SetSDDLSecurity( string sd,
        SECURITY_INFORMATION si )
    public void SetSecurity( GenericSecurityDescriptor gsd ,
                                    SECURITY_INFORMATION si )
    public string GetUserEffectiveSecurity( )
    public void AddHoldingLink( Guid itemId )
    public void RemoveHoldingLink( Guid itemId )
}
```

The following provides a brief description for the security interfaces 410 through 430:

public string GetSDDLSecurity( )—Retrieves the entire security descriptor on the item in SDDL string format. It includes inherited and explicit Access Control lists.

public GenericSecurityDescriptor GetSecurity( )—Retrieves the entire security descriptor on the item in the format of a Managed ACLs class GenericSecurityDescriptor.

public void SetSDDLSecurity (string sd, SECURITY_INFORMATION si) Sets the security descriptor on the item. This function ignores the inherited ACEs. It re-generates the inherited ACEs from its parent and other holding links. It can be called to set owner, group, control flag or explicit ACEs. SECURITY_INFORMATION specifies which part of the security descriptor is to be updated.

public void SetSecurity(GenericSecurityDescriptor gsd, SECURITY_INFORMATION si)—Sets the security descriptor on the item. Takes the Managed ACLs class as the input parameter.

public void AddHoldingLink(Guid itemId)—Updates the security descriptor on the item when adding a new holding link to the item.

public void RemoveHoldingLink(Guid itemId)—Updates the security descriptor on the item when removing a new holding link from the item.

public string GetUserEffectiveSecurity( )—Retrieve the security descriptor on the item that contains the ACEs relevant to the current security context.

Figure 5:
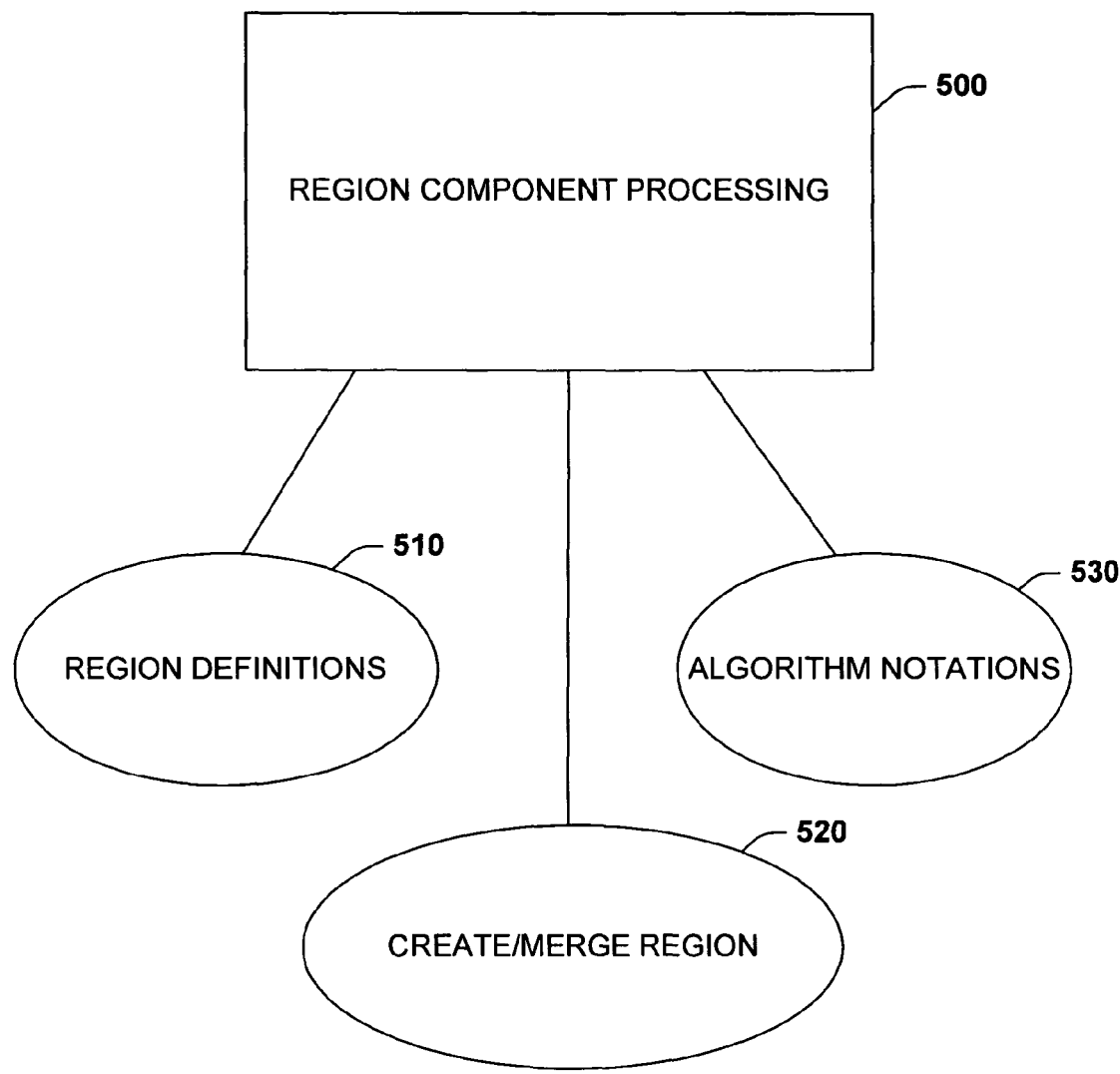
FIG. 5 illustrates region component processing in accordance with an aspect of the subject invention.

FIG. 5 illustrates region component processing 500 in accordance with an aspect of the subject invention. At 510, region definitions are provided. These include an security descriptor (SD) region which is a set of items that share the same SD. The set of items do not have to form a contiguous tree. A security hierarchy (SH) row is a row in a [Table!Security_Hierachy] table listed below. Each SD region should have an SH row in the table.

| _ParentSDId | _SDId | _RootItemId | _IsContainer | _Scope |
|---|---|---|---|---|
| SD0 | SD1 | ItemId | 0 | 3 |

A row in the above table is referred to as an SH row which corresponds to an SD region. Rows in this table indicate a set of items (can be a single item) share the same security descriptor (SD1 in the above example). The set of items are defined by a common root (the ItemId), a common type (container or non-container) and a scope. The scope is optional to support different operating system security models.

At 520, region merge and creation considerations are described. In this aspect, one new SD region may be created under the following conditions:
 1. SD changes made on a non-container item.

Three new SD regions may be created under the following conditions:
 1. SD changes made on a container item, and
 2. The SD changes doesn't include non-propagate ACEs.

Five new SD regions may be create under the following conditions:
 1. SD changes made on a container item, and
 2. The SD changes include non-propagate ACEs.

SD regions may be merged under the following conditions:
 1. Parent SD is enforcing SD inheritance by flushing child SDs. or
 2. Explicit ACEs are removed from a SD.

At 530, various notions are provided that may be employed in the following algorithms described with respect to FIG. 6. These notations include:

_Item or *—The current item system applying the operations on.

SDId(x) or SDId—The sd_id of the security descriptor on item x.

SDId_NC(x) or SDId_NC—The SDId applies to non-container child objects of item x.

SDId_C(x) or SDId_C—The SDId applies to container child objects of item x.

SDId_NC2(x) or SDId_NC2—The SDId applies to direct non-container child objects of item x.

SDId_C2(x) or SDId_C2—The SDId applies to direct container child objects of item x.

SDId_NC3(x) or SDId_NC3—The SDId applies to non-direct non-container child objects of item x.

SDId_C3(x) or SDId_C3—The SDId applies to non-direct container child objects of item x.

SHRow(x, i, j)—The row in [Table!Security_Hierachy] table where _RootItemId=x, _IsContainer=i, _Scope=j UpdateItemSD(OldSDId, NewSDId, RootItem, IsContainer, Scope)—Update the SDId of all items of type (IsContainer) whose current SDId=OldSDId, ancestor is RootItem within the Scope to NewSDId.

UpdateSDBlob(SDId)—Update the content of the security descriptors of this SDId and its children if the SDId of its children do not form a cycle with this SDId. For example, when a holding link (with SD0) is added on to a file item (with SD1) which doesn't have its own row in [Table!Security_Hierachy] table, three rows will be created (SD0, SD1, _Item, 0, 0), (SD1, SD0, _Item, 0, 1), (SD1, SD0, _Item, 1, 1). Here reuse SD0 for the child items of this item to significantly reduce the number of updates in [Table!Item] table.

UpdateSDId (SDId, SDId_New) - Update the rows of the current item in [Table!Security_Hierachy] where _SDId = SDId to set _SDId = SDId_New.

UpdateParentSDId (SDIdPar, SDIdPar_New) - Update the rows of [Table!Security_Hierachy] where _ParentSDId = SDIdPar to set _ParentSDId = SDIdPar_New.

CreateNewSD (SDId)—Create a new SD from the current SD plus the changes being made (add/remove ACEs, add/remove holding links).

Figure 6:
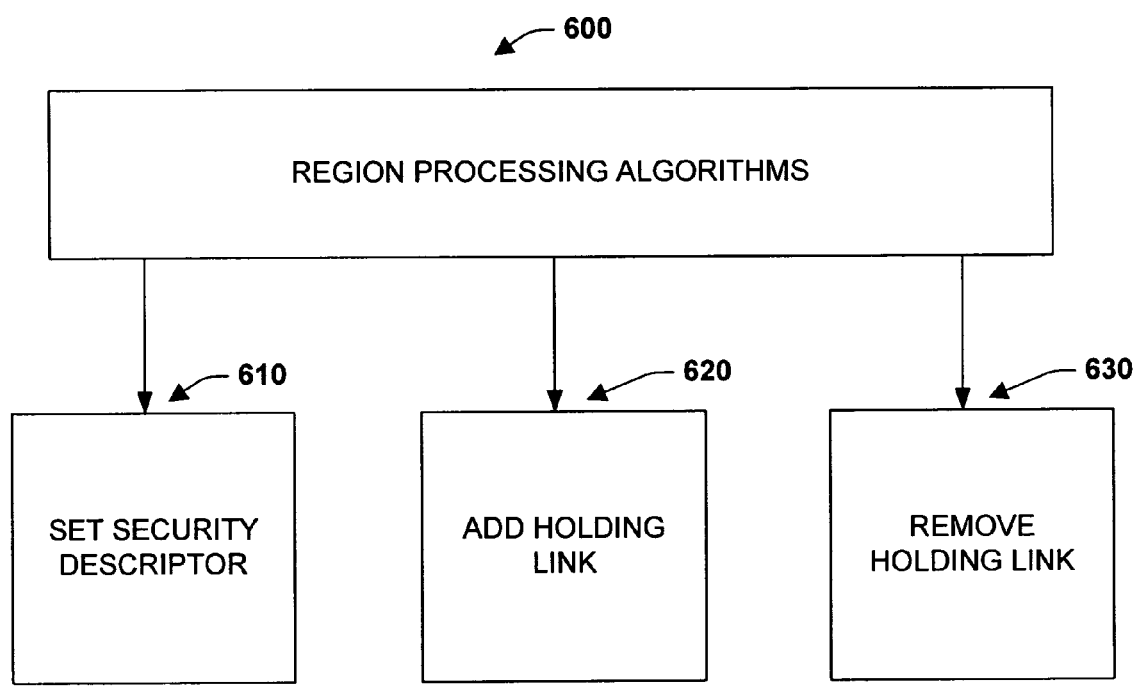
FIG. 6 illustrates example region processing algorithms in accordance with an aspect of the subject invention.

FIG. 6 illustrates example region processing algorithms 600 in accordance with an aspect of the subject invention. In this aspect, at least three separate or combined algorithms 600 can be employed to effect region processes. These include a Set security descriptor at 610; a Add holding link 620; and a Remove holding link algorithm at 630. With respect to the Set Security Descriptor 610, there are various ways to change the security descriptor on an object that at least include:

Add/Remove non-inheritable explicit ACEs.
 Add/Remove inheritable explicit ACEs that apply to this item and all its children.
 Add/Remove inheritable explicit ACEs that only apply to its children.
 Add/Remove inheritable explicit ACEs that only apply to this item and its direct children.
 Add/Remove inheritable explicit ACEs that only apply to child containers.
 Add/Remove inheritable explicit ACEs that only apply to child objects.
 Add/Remove inheritable explicit ACEs that only apply to certain type of objects.

Change the owner of security descriptor
Change the group of security descriptor
Change security descriptor control flags.
  i. Stop inheritance of ACEs
  ii. Start inheritance of ACEs
  iii. Change other control flags only applied to this item.

At 620, when a holding link is added to an item, the security descriptor on this item may or may not be changed, depending on whether the holding link has inheritable ACEs and whether the SD on this item has SE_DACLE_PROTECTED flag on. However, the [Table! Security_Hierachy] table should be updated. When a holding link is added onto an item, three new rows for the item should be added into the in [Table!Security_Hierachy] table if the item does not have a designated row yet. To reduce the update in [Table!Item] table, the following formats can be used to create these rows: (SD0, SD1, *, 0, 0), (SD1, SD0, *, 0, 1), (SD1, SD0, *, 1, 1) where SD0 is the old SDId of the target item of the holding link, SD1 is the new SDId of the target item. By this scheme, should only need to update the source item in [Table!Item] table. Based on this scheme, if an explicit non-inheritable ACE is added onto this item later, do not perform an update in [Table!Item] table. At 630, it can be assumed the SDId of the security descriptor on the holding link to be removed is SDId_HD. In the case of removing holding link, SD regions may collapse, and thus rows in [Table! Security_Hierachy] may be merged.

Figure 7:
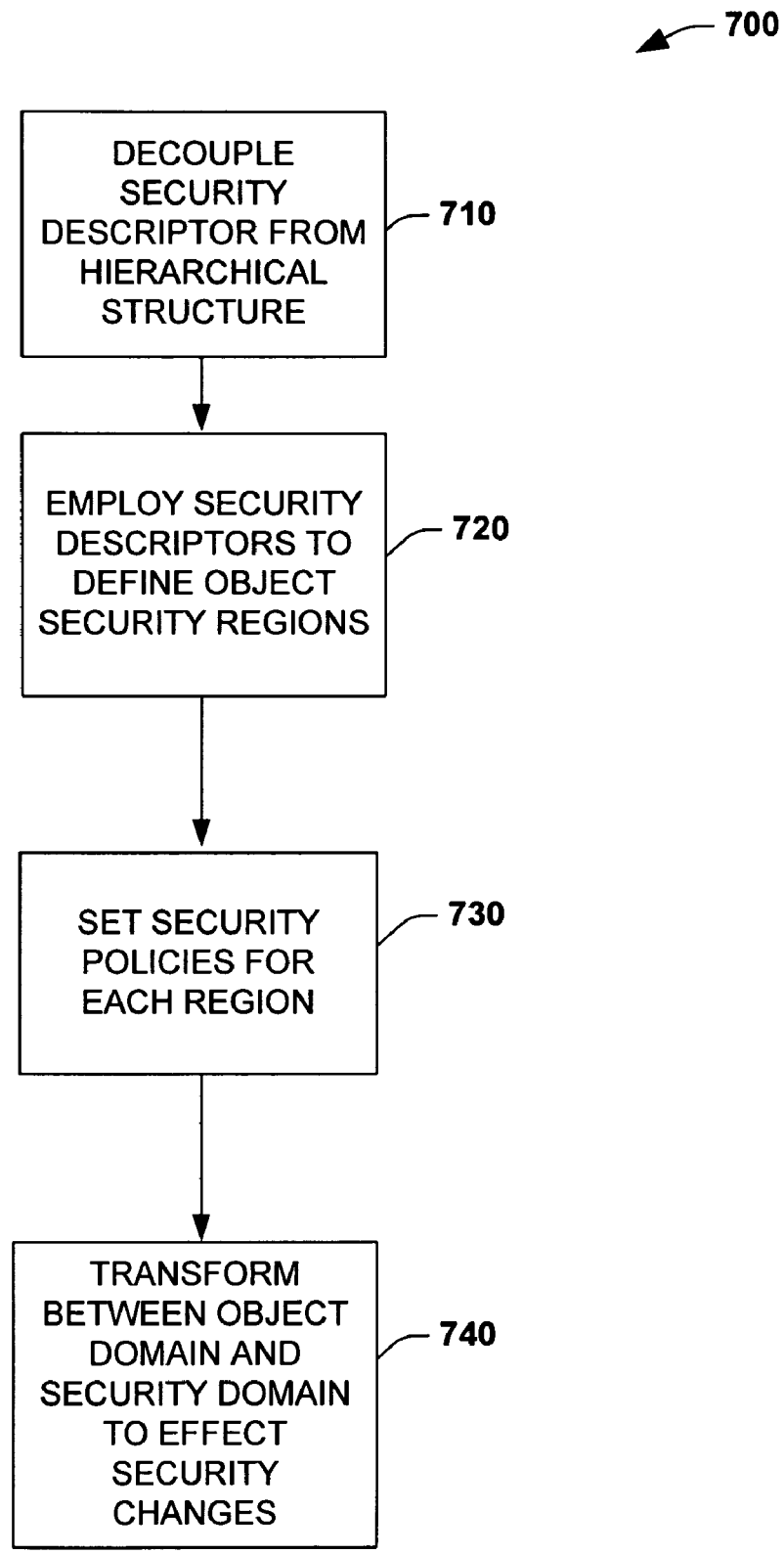
FIG. 7 illustrates a security region process in accordance with an aspect of the subject invention.

FIG. 7 illustrates an example security region process 700 for database object security in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Proceeding to 710 of FIG. 7, security descriptors for respective objects in a database are decoupled or disassociated from a classical object hierarchy by removing the requirement for each object to be updated (security wise) in view of any potential update in the hierarchy. At 720, one or more security descriptors are utilized to define object regions for objects residing in the database. As noted above, this can include collapsing or merging object security data from similar or dissimilar object trees in order to define security regions or object subsets that subscribe to similar security data of the region. Also, such region data can be defined in a row of the database including resulting relationships to other objects belonging to the region. At 730, object security policies are set per selected regions in the database. As noted above, depending on the type of Access Control Entry (Implied/Explicit) and the location of a security change in an object hierarchy, various security regions may be created from such settings. At 740, transforms occur between classical object domains and the security domains of the subject invention in order to propagate security changes within the database. This can include creating region subsets around a given object at the time a security change is requested for the object (e.g., create three or five regions depending on security change type).

Figure 8:
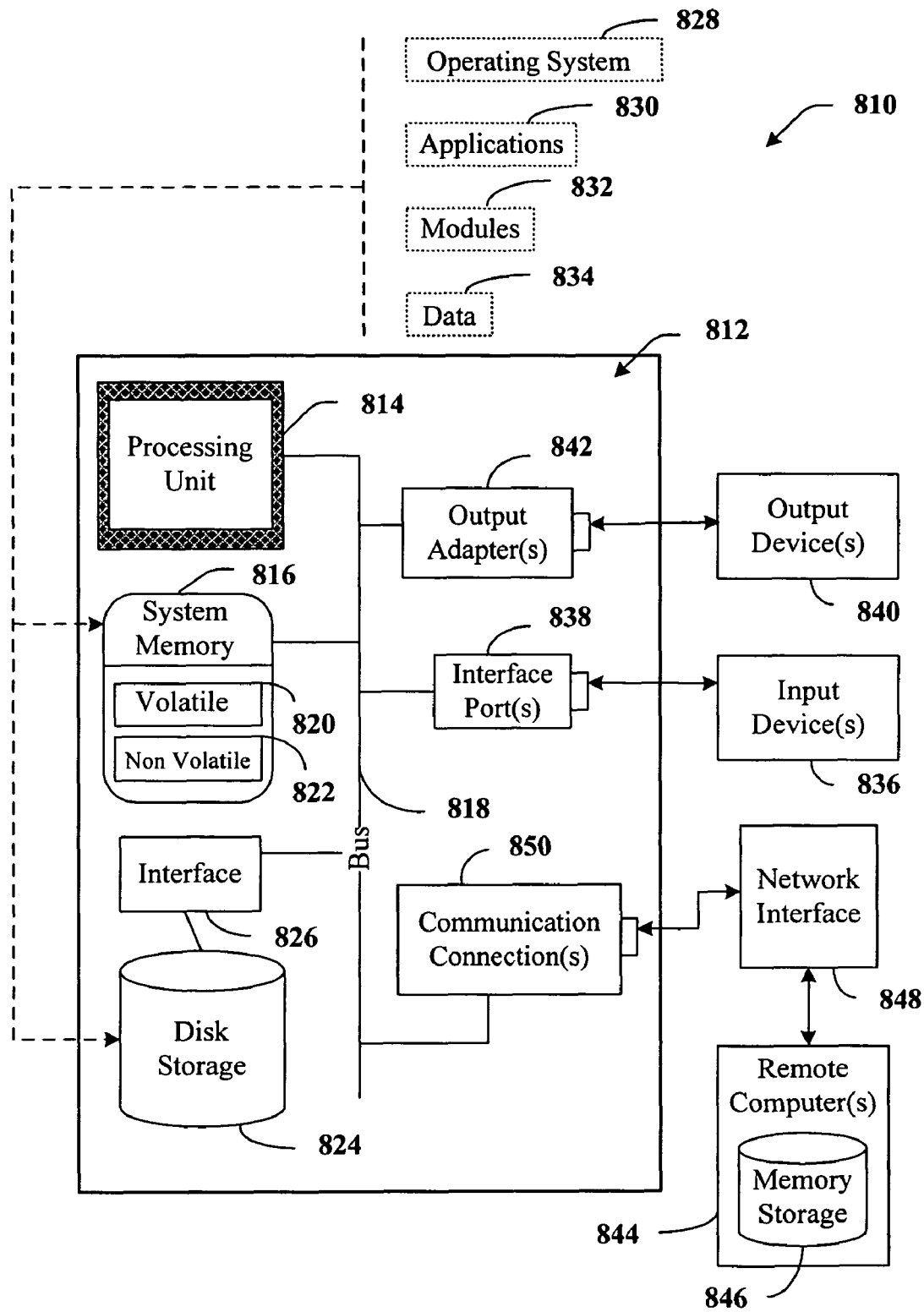
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
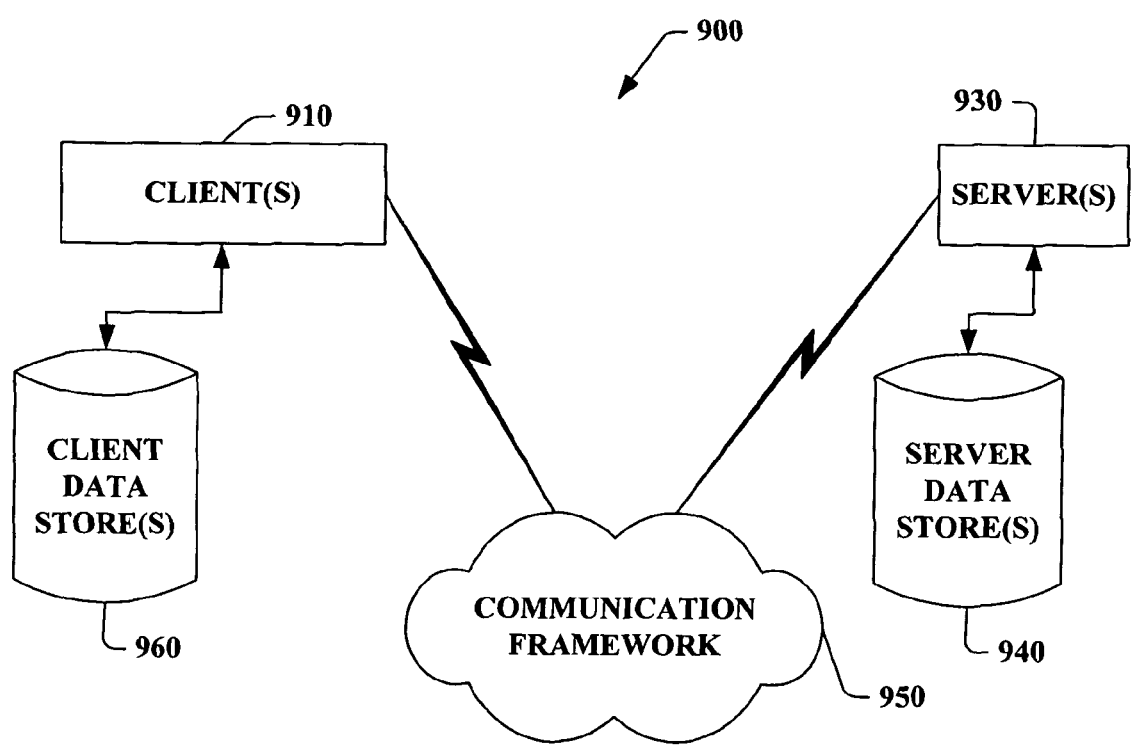
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising both a processor and a memory configured to facilitate database security and management, the system comprising:
   a database component that stores a plurality of objects having a first hierarchical relationship between the plurality of objects based on one or more first inheritance relationships between the plurality of objects;
   a region component that defines a plurality of security zones, each security zone being associated with (i) a corresponding security descriptor that describes security properties for the security zone, and (ii) a corresponding security descriptor identifier that identifies the corresponding security descriptor, wherein the plurality of security zones form a second hierarchical relationship between the security zones based on one or more second inheritance relationships between the security zones, the second hierarchal relationship of security zones being separate and different from the first hierarchical relationship between the plurality of objects; and
   a mapping component that associates each of the plurality of objects with a corresponding security descriptor identifier of one of the plurality of security zones, such that one or more of the plurality of objects that share a particular corresponding security descriptor are part of a particular security zone having the particular corresponding security descriptor, and such that access to each of the plurality of objects is governed by the corresponding security descriptor defined in the security zone associated with the object, as opposed to the first hierarchical relationship between the plurality of objects.

2. The system of claim 1, wherein the region component and the mapping component comprise one or more database tables.

3. The system of claim 1, wherein an object is associated with a security zone by associating an item identifier for the object with the corresponding security descriptor identifier for the security zone.

4. The system of claim 1, wherein, in response to a request to change a particular security descriptor that is associated with a particular object, the region component either splits a security zone or merges a security zone.

5. The system of claim 4, wherein the particular object is a container object and wherein the region component splits the security zone into three security zones by performing the following:
   creating a first new security zone in the region component and associating the first new security zone with the container object in the mapping component;
   creating a second new security zone in the region component and associating the second new security zone with any container objects that are children of the container object in the mapping component; and creating a third new security zone in the region component and associating the third new security zone with any non-container objects that are children of the container object in the mapping component.

6. The system of claim 4, wherein the particular object is a container object and wherein the region component splits the security zone into five security zones by performing the following:

creating a first new security zone in the region component and associating the first new security zone with the container object in the mapping component;

creating a second new security zone in the region component and associating the second new security zone with any container objects that are children of the container object in the mapping component;

creating a third new security zone in the region component and associating the third new security zone with any non-container objects that are children of the container object in the mapping component;

creating a fourth new security zone in the region component and associating the fourth new security zone with any non-direct non-container objects that are children of the container object in the mapping component; and creating a fifth new security zone in the region component and associating the fifth new security zone with any non-direct container objects that are children of the container object in the mapping component.

7. The system of claim 4, wherein the request to change the particular security descriptor that is associated with the particular object comprises a request to change an Access Control Entry (ACE) defined in the particular security descriptor that is associated with the particular object.

8. The system of claim 7, wherein the ACE represents an explicit or an implicit security change.

9. The system of claim 4, wherein a security zone is merged with another security zone if the change to the particular security descriptor that is associated with the particular object causes the security zone to have the same security descriptor as another security zone.

10. The system of claim 9, wherein an interface for interacting with object security includes a get security function, a get descriptor function, a set security function, an add holding link function, a remove holding link function, and a get effective security function.

11. The system of claim 1, wherein the mapping component organizes each security zone as a security hierarchy row in a database table.

12. A tangibly embodied computer storage device having computer readable instructions which, when executed by one or more processors of a computer system, cause the computer system to perform a method of defining security regions for objects in a database, the method comprising:

the computer system defining a plurality of objects in a database, the plurality of objects having a first hierarchical relationship between the plurality of objects based on one or more first inheritance relationships between the plurality of objects;

the computer system defining a plurality of security regions for defining access to the objects, wherein each security region is associated with (i) a corresponding security descriptor that describes security properties for the security region, and (ii) a corresponding security descriptor identifier that identifies the corresponding security descriptor, and wherein the plurality of security regions form a second hierarchical relationship between the security regions based on one or more second inheritance relationships between the security regions, the second hierarchal relationship of security zones being separate and different from the first hierarchical relationship between the plurality of objects; and the computer system providing a mapping table that associates each of the plurality of objects with a corresponding security descriptor identifier of one of the plurality of security regions, such that one or more of the plurality of objects that share a particular corresponding security descriptor are part of a particular security region having the particular corresponding security descriptor, and such that access to each of the objects is governed by the corresponding security descriptor defined in the security region associated with the object, as opposed to the first hierarchical relationship between the plurality of objects.

13. A computer-implemented method for defining security regions for objects in a database, the method comprising:

a computer system which includes one or more processors, defining a plurality of database objects in a database, the plurality of database objects having a first hierarchical relationship between the plurality of database objects based on one or more first inheritance relationships between the plurality of database objects;

the computer system defining a plurality of security regions for defining access to the database objects, wherein each security region is associated with (i) a corresponding security descriptor that describes security properties for the security region, and (ii) a corresponding security descriptor identifier that identifies the corresponding security descriptor, and wherein the plurality of security regions form a second hierarchical relationship between the security regions based on one or more second inheritance relationships between the security regions, the second hierarchal relationship of security zones being separate and different from the first hierarchical relationship between the plurality of database objects; and the computer system providing a mapping table that associates each of the plurality of database objects with a corresponding security descriptor identifier of one of the plurality of security regions such that one or more of the plurality of database objects that share a particular corresponding security descriptor are part of a particular security region having the particular corresponding security descriptor, and such that access to each of the database objects is governed by the corresponding security descriptor defined in the security region associated with the database object, as opposed to the first hierarchical relationship between the plurality of objects.

14. The computer-implemented method of claim 13, further comprising:

in response to a request to change a particular database object's security descriptor, either splitting or merging a security region.

15. The computer-implemented method of claim 14, wherein the particular database object is a container object and wherein the security region is split into three security regions by performing the following:

creating a first new security region and associating the first new security region with the container object;

creating a second new security region and associating the second new security region with any container objects that are children of the container object; and creating a third new security region and associating the third new security region with any non-container objects that are children of the container object.

16. The computer-implemented method of claim 14, wherein the particular database object is a container object and wherein the security region is split into five security regions by performing the following:
  creating a first new security region and associating the first new security region with the container object;
  creating a second new security region and associating the second new security region with any container objects that are children of the container object;
  creating a third new security region and associating the third new security region with any non-container objects that are children of the container object;
  creating a fourth new security region and associating the fourth new security region with any non-direct non-container objects that are children of the container object; and
  creating a fifth new security region and associating the fifth new security region with any non-direct container objects that are children of the container object.

17. The computer-implemented method of claim 14, wherein the request to change the particular database object's security descriptor comprises a request to change an Access Control Entry (ACE) defined in the security descriptor associated with the particular database object.

18. The computer-implemented method of claim 17, the Access Control Entry represents an explicit or an implicit security change.

19. The computer-implemented method of claim 14, wherein a security zone is merged with another security zone if the change to the particular database object's security descriptor causes the security zone to have the same security descriptor as another security zone.

* * * * *